(12) United States Patent
Srivastava et al.

(10) Patent No.: US 11,940,881 B1
(45) Date of Patent: Mar. 26, 2024

(54) EFFICIENT IDENTIFICATION OF SNAPSHOT OBJECTS USING FULL AND DIFFERENTIAL SNAPSHOT MANIFESTS

(71) Applicant: Amazon Technologies, Inc., Seattle, WA (US)

(72) Inventors: Swapnil Srivastava, Seattle, WA (US); Ravi Sekhar Cherukuri, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 61 days.

(21) Appl. No.: 17/027,374

(22) Filed: Sep. 21, 2020

(51) Int. Cl.
*G06F 11/14* (2006.01)
*G06F 16/11* (2019.01)

(52) U.S. Cl.
CPC ...... *G06F 11/1453* (2013.01); *G06F 11/1451* (2013.01); *G06F 16/128* (2019.01)

(58) Field of Classification Search
CPC . G06F 11/1453; G06F 11/1451; G06F 16/128
USPC ......................................................... 711/162
See application file for complete search history.

(56) References Cited

U.S. PATENT DOCUMENTS

| | | | | |
|---|---|---|---|---|
| 7,257,606 B2* | 8/2007 | Kapoor | ................... | G06F 16/10 |
| 8,789,208 B1* | 7/2014 | Sundaram | ............. | G06F 3/0622 |
| | | | | 726/28 |
| 2011/0167221 A1* | 7/2011 | Pangal | .................... | G06F 3/067 |
| | | | | 711/117 |
| 2011/0258404 A1* | 10/2011 | Arakawa | ............... | G06F 3/0689 |
| | | | | 711/170 |
| 2015/0127608 A1* | 5/2015 | Hsieh | ...................... | G06F 16/27 |
| | | | | 707/623 |
| 2020/0167238 A1* | 5/2020 | Killamsetti | ......... | G06F 11/1461 |
| 2020/0285616 A1* | 9/2020 | George | ................ | G06F 16/178 |

* cited by examiner

*Primary Examiner* — Gautam Sain
*Assistant Examiner* — Wei Ma
(74) *Attorney, Agent, or Firm* — Knobbe, Martens, Olson, Bear, LLP

(57) ABSTRACT

Systems and methods are provided for efficient post-processing of object-based snapshots of block-storage volumes, which post-processing may include garbage collection, validation, or resource usage auditing for the snapshots. An object-based snapshot can be logically represented by a set of objects stored on an object storage service, which objects collectively represent a copy of the data of a corresponding block-storage volume at a given point in time. Each snapshot can further be represented by a full manifest that includes a full listing the set of objects representing the block-storage volume, and a differential manifest that includes a listing of objects unique to the snapshot relative to a prior snapshot of the same volume. Full manifests enable each snapshot to remain independently represented, while differential manifests enable efficient post-processing by reducing the amount of data retrieved and processed to identify an aggregate of all objects referenced across a group of snapshots.

20 Claims, 7 Drawing Sheets

EFFICIENT IDENTIFICATION OF SNAPSHOT OBJECTS USING FULL AND DIFFERENTIAL SNAPSHOT MANIFESTS

BACKGROUND

Cloud computing, in general, is an approach to providing access to information technology resources through services, such as Web services, where the hardware and/or software used to support those services is dynamically scalable to meet the needs of the services at any given time. In cloud computing, elasticity refers to network-delivered computing resources that can be scaled up and down by the cloud service provider to adapt to changing requirements of users. The elasticity of these resources can be in terms of processing power, storage, bandwidth, etc. Elastic computing resources may be delivered automatically and on-demand, dynamically adapting to the changes in resource requirement on or within a given user's system. For example, a user can use a cloud service to host a large online streaming service, set up with elastic resources so that the number of webservers streaming content to users scale up to meet bandwidth requirements during peak viewing hours, and then scale back down when system usage is lighter.

A user typically will rent, lease, or otherwise pay for access to resources through the cloud, and thus does not have to purchase and maintain the hardware and/or software to provide access to these resources. This provides a number of benefits, including allowing users to quickly reconfigure their available computing resources in response to the changing demands of their enterprise, and enabling the cloud service provider to automatically scale provided computing service resources based on usage, traffic, or other operational needs. This dynamic nature of network-based computing services, in contrast to a relatively static infrastructure of on-premises computing environments, requires a system architecture that can reliably re-allocate its hardware according to the changing needs of its user base.

Cloud service providers can provide computing resources in a variety of forms, which may be combined by users to provide desired functions or services. For example, a cloud provider can provide compute resources, like virtual machines, that conduct computation, block storage resources that act as virtual hard drives for compute resources, object storage services that act as network-accessible data stores, and the like. As the number of users of cloud services grows, the amount of data held and maintained by the cloud services can become very large. To ensure correct operation of cloud services, a provider can undertake a variety of processing tasks with respect to that data. For example, a provider may validate stored data to ensure it is stored without errors, conduct garbage collection to ensure unused data is not unnecessarily stored, or conduct a resource usage audit to ensure that resources are appropriated allocated between users or determine which users have utilized which cloud resources. When the volume of data held and maintained by a cloud service grows large, these processing tasks can themselves utilize significant computing resources.

DETAILED DESCRIPTION

Figure 1:
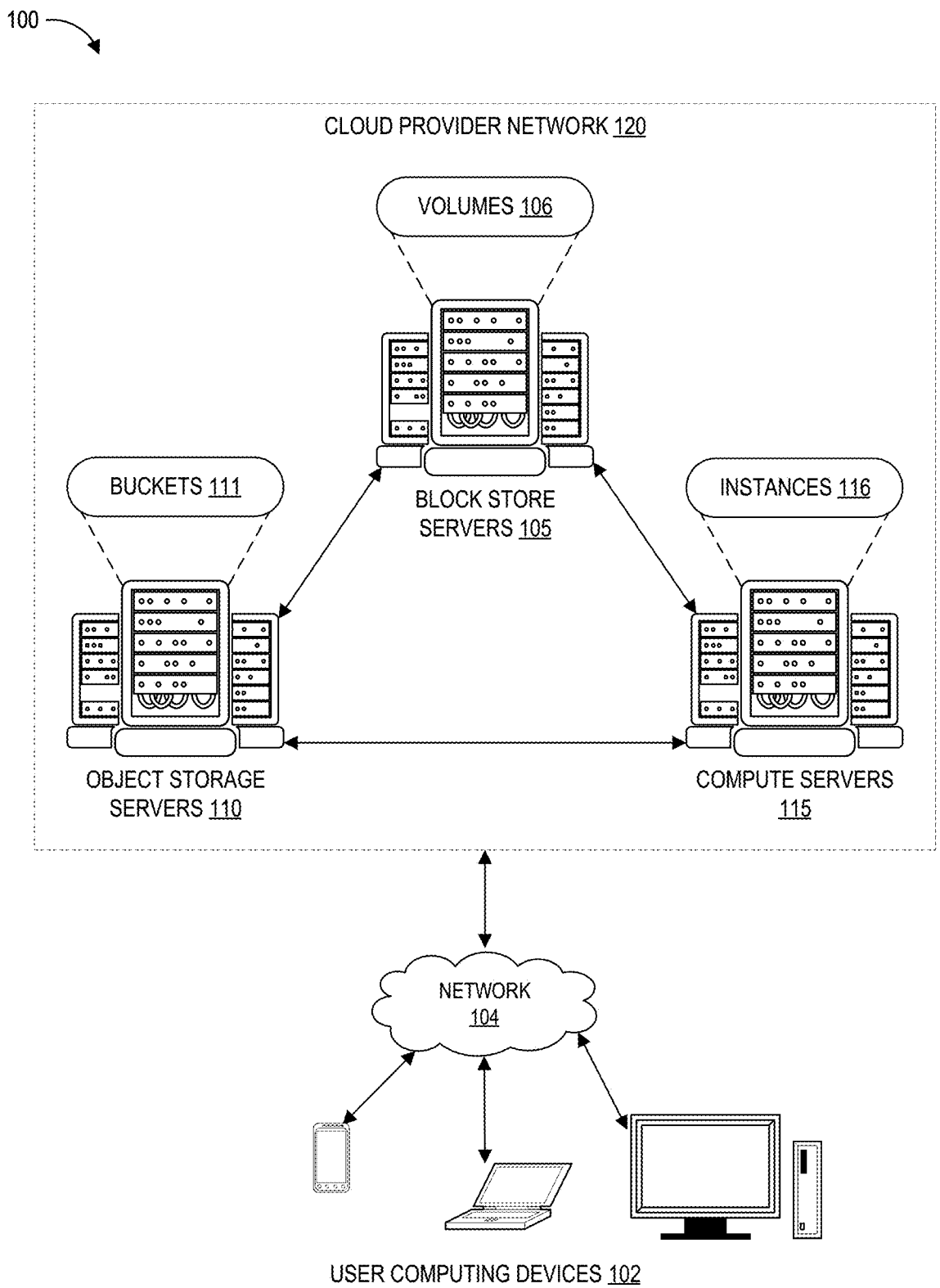
FIG. 1 depicts a schematic diagram of a cloud provider network in which various embodiments according to the present disclosure can be implemented.

Generally described, aspects of the present disclosure relate to the management of object-based "snapshots" for cloud-based block storage volumes, which may represent virtualized hard drives used by, for example, virtual machines. Each object-based snapshot can reflect a point-in-time representation of a block storage volume, with the snapshot being stored as separately from the block storage volume, as a set of objects on an object storage service. For example, an object-based snapshot may be viewed conceptually as a "copy" of the volume (as it existed at a given point in time) stored as a set of files on a network-accessible storage service. Each snapshot may be associated with a manifest that lists the objects making up the data of the snapshot, such that a system can access the manifest to identify the objects and re-create data of the snapshot. More specifically, aspects of the present disclosure relate to conducting post-processing (e.g., maintenance) on object-based snapshots, such as validation, garbage collection, or resource audits. As discussed in more detail herein, these tasks often require identification of a set of objects used by the snapshots, which set of objects is then validated, checked during garbage collection, audited for usage, etc. These tasks are generally completed at the level of individual objects; however, in many configurations multiple snapshots might refer to the same object. Thus, prior to completing a task, a system may be required to de-duplicate a listing of objects referenced across a set of snapshots, such that the listing of objects to be processed by the task contains only unique objects. One way to complete such deduplication might be to obtain the manifest of each snapshot, combine a listing of objects in each manifest, and deduplicate that listing to result in a set of unique objects. Particularly in large systems (e.g., storing hundreds, thousands, or millions of snapshots), deduplicating such a listing of objects can require significant computing resources. Aspects of the present disclosure provide for more efficient deduplication of a listing of objects making up a set of snapshots by use of two different types of manifest for a snapshot: a full manifest and a differential manifest. As discussed herein, these two manifests may be used in combination to provide for more efficient deduplication of a listing of objects referenced across a set of snapshots, and thus for more efficient implementation of post-processing tasks.

Generally described, a manifest for a snapshot refers to data that lists the objects that make up the snapshot. For example, a snapshot of a 1-gigabyte (GB) drive may be divided into 1000 distinct 1-megabyte (MB) "chunks" (which may alternatively be referred to as blocks, portions, etc.), with each chunk being stored as a distinct object on an object storage service. Each chunk can be assigned an identifier, such that it can be retrieved from the object storage service using the identifier. To enable retrieval of the snapshot (e.g., for use in provisioning a new virtual hard drive), a system can create a manifest that lists the 1000 distinct chunks by their identifier on the system, potentially along with other metadata (such as the size of each chunk). Thus, a system can open the manifest and retrieve the listed objects to retrieve the snapshot.

In a system in which each object is unique to a given manifest, it may be relatively simple to identify a unique listing of objects across a set of manifests, as no deduplication within the listing of objects would be required. However, the problem of identifying a unique listing of objects across a set of manifests can become more complicated when a system enables multiple snapshots to refer to a single object. For example, a system may provide for incremental snapshots, such that such that a given snapshot stores only changes made to a volume since a prior snapshot. Illustratively, a user may create an object-based snapshot of a volume at a first point in time, causing a set of objects to be stored that reflect the data of the volume at that point in time. The user may then make changes to the volume, and request at a second point in time that a second snapshot be created. Rather than making another complete copy of the volume, the system may make a copy of only the changes made to the volume since the first snapshot. By combining those changes with the data of the first snapshot, the data of the volume at the second point of time can be re-created. A distinct manifest can be created for each snapshot, with each manifest listing the objects that make of the data of the respective snapshot. Because the second snapshot relies on at least some data of the first snapshot, the second manifest may refer to at least some objects also referred to in the first snapshot. Use of incremental snapshots can facilitate more rapid creation of snapshots, since the amount of data stored for each snapshot is reduced. However, the multiple dependencies created by incremental snapshots can make it more difficult to determine a unique set of objects referred to be all snapshots, increasing the amount of data reviewed to identify that unique set of objects and in some cases necessitating deduplication of a listing of objects prior to conducting post-processing on objects.

The manifests in the example given above, which include a full listing of objects that make up a snapshot, can generally be referred to herein as a "full" manifest. Use of full manifests can be beneficial, for example, in maintaining independence of snapshots. More specifically, because a full manifest lists all objects making up the data of a snapshot, the snapshot can be logically represented by a combination of the full manifest and the objects listed in the manifest, without reference to other data. Thus, even if the snapshot is incremental to a prior snapshot, no dependency exists between the manifests of the two snapshots. Accordingly, in the example above, deletion of the first snapshot might be accomplished by deleting the manifest for that snapshot. This deletion would have no effect on the second snapshot, as the manifest for the second snapshot continues to list the set of objects making up the second snapshot. A later garbage collection process could then remove any objects not referred to in any manifest (e.g., those objects unique to the first snapshot), thus completing deletion of the snapshot. However, that garbage collection process may generally rely on a unique listing of all objects referenced by any snapshot, in order to determine what objects are not referenced by any snapshot. Because at least some objects may be duplicative across full manifests, requiring the garbage collection process to gather, review, and potentially deduplicate the full manifests of each snapshot can be inefficient.

To address this inefficiency, embodiments of the present disclosure provide for a second type of manifest, a "differential manifest." As discussed herein, a differential manifest can include a listing of objects that are unique to a given snapshot relative to a prior snapshot on which the given snapshot depends. As an example, consider an instance in which a first snapshot is logically represented by a set of objects $\{A_1, B_1, C_1\}$, and a second snapshot is represented by objects $\{A_1, B_2, C_1\}$, with $B_2$ representing a different object than $B_1$. In such a case, the full manifests for each snapshot may reference the full set of objects of each snapshot, while a differential manifest for the second snapshot may list only $B_2$, as that is the sole object of the second snapshot that differs from the objects of the first snapshot. This creation of a differential manifest simplifies identification of a unique set of objects referenced across the two snapshots. More specifically, the unique set of objects may be determined by combining the objects listed in the full manifest of the first snapshot with the objects listed in the differential manifest of the second object. Such a combination avoids a need to deduplicate objects within the listing. Moreover, because a differential manifest is typically expected to be smaller than a full manifest, retrieval and processing of the differential manifest for the second snapshot can be expected to use less computing resources than retrieval and processing of the full manifest for that second snapshot (with the savings being generally inversely correlated to an overall rate of change between snapshots, such that a lower rate of change results in higher savings). Particularly when applied across a large number of snapshots, this reduction in computing resources can be significant.

In the example above, it is assumed that the first snapshot is not an incremental snapshot. Thus, it may not be associated with a differential manifest or may be associated with a differential manifest containing a listing of no objects. However, it is equally possible that the first snapshot is incremental relative to a still prior snapshot. In such a case, the first snapshot can also be associated with a differential manifest listing objects of the first snapshot that differ relative to the still prior snapshot. A listing of objects unique across all three snapshots can be obtained by combining the full manifest of the initial (non-incremental) snapshot with the differential manifests of each incremental snapshot.

For ease of reference, the present disclosure will refer to relationships between incremental snapshots by arranging such relationships within a tree data structure. A first, non-incremental snapshot can represent the root node of the tree, and each incremental snapshot created from a snapshot of a given node can be represented as a child node to that given node. Nodes in a tree can be referred to using familial terminology, e.g., "parent" and "child" to refer to a first snapshot and a second snapshot that increments of the first snapshot, "grant parent" to refer to a still prior snapshot to the first snapshot, etc. While snapshots within any given lineage are typically expected to be time-ordered, this may not hold true across different branches of a relationship tree. For example, a user may create a child and grandchild snapshot from a given parent snapshot, and then at a later point in time revert a volume to the state of the parent snapshot to create other child snapshots. Thus, complex familiar relationships can exist between snapshots. Nevertheless, each incremental snapshot can be described as a set of differences relative to an immediate parent snapshot.

As discussed above, use of a combination of full and differential manifests can simplify identification of unique objects among a set of snapshots. More specifically, that set of unique objects can be created by retrieving a full manifest for any non-incremental snapshots and differential manifests for incremental snapshots, and combining objects referenced in each retrieved manifest. (In some instances, the combined listing of objects may still require deduplication, since multiple child snapshots may refer to the same object but represent non-incremental snapshots after deletion of a parent snapshot, as described below.) Differential manifests are expected to be smaller than full manifests, and thus require fewer computing resources to retrieve and process. One aspect of this process is that a system creating such a listing might be required to identify a given snapshot as incremental or non-incremental. To facilitate such identification, embodiments of the present disclosure can maintain metadata for each snapshot, including information such as whether the snapshot is incremental or non-incremental. When a unique list of objects is desired, the system may use the metadata to determine whether each snapshot is incremental or non-incremental, and retrieve an appropriate manifest for each snapshot according to that state. The metadata may be stored, for example, as entries in a database, and thus this metadata may take little resources to store or retrieve. For example, state of a snapshot as incremental or non-incremental could be represented in as little as a single bit. Thus, maintaining and using metadata for a snapshot is expected to require few computing resources, particularly relative to resources saved by use of a combination of full and differential manifests.

Notably, embodiments of the present disclosure that combine the use of full and differential manifest can maintain benefits associated with each type of manifest. For example, full manifests can continue to be used as described above, such as for provisioning a new block storage volume with the data of a snapshot, maintaining independence between snapshots. Moreover, use of differential manifests need not complicate other processes, such as deletion of a parent snapshot. For example, one might assume that deletion of a parent snapshot would require re-creation of the differential manifests of each child snapshot. However, such deletion may be handled in some embodiments by simply modifying the metadata of each child snapshot to indicate that it is a non-incremental snapshot, thus causing corresponding processes to utilize the full manifest of each child snapshot rather than the differential manifests. (As noted above, this operation may result in multiple child snapshots referencing the same object, and thus deduplication may be required if a listing of unique objects referenced among the child snapshots is desired.) Differential manifest for the child snapshots may then be modified (or deleted) asynchronously to a delete operation for the parent snapshot. In this way, the use of a combination of full and differential snapshots is not expected to significantly increase complexity of user-facing operations relative to use of full snapshots alone.

As will be appreciated by one of skill in the art in light of the present disclosure, the embodiments disclosed herein improve the ability of computing systems, such as cloud computing systems utilizing object-based snapshots, to conduct post-processing with respect to those snapshots, including validation, garbage collection, and usage auditing. Moreover, the presently disclosed embodiments address technical problems inherent within computing systems; specifically, the limited nature of computing resources in processing data and the difficulty of retrieving and deduplicating large amounts of data. These technical problems are addressed by the various technical solutions described herein, including the creation and use of both full and differential manifests for a set of snapshots, and use of a combination of full and differential manifests when identifying a set of unique objects across multiple snapshots. Thus, the present disclosure represents an improvement on computing systems utilizing object-based snapshots and computing systems in general.

The foregoing aspects and many of the attendant advantages of this disclosure will become more readily appreciated as the same become better understood by reference to the following description, when taken in conjunction with the accompanying drawings.

FIG. 1 depicts an example computing environment 100 including a cloud provider network 120 in which embodiments of the present disclosure can be implemented The cloud provider network 120 can be accessed by user computing devices 102 over a network 104. A cloud provider network (sometimes referred to simply as a "cloud"), refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network 120 may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

In FIG. 1, the cloud provider network 120 includes one or more block store servers 105, one or more object storage servers 110, and one or more compute servers 115 that are in networked communication with one another and with the network 104 to provide users with on-demand access to computing resources including volumes 106, buckets 111, and instances 116, among others. These particular resources are described in further detail below. Some implementations of cloud provider network 120 can additionally include domain name services ("DNS") servers, relational database servers, and other server configurations (not illustrated) for supporting on-demand cloud computing platforms. Each server includes hardware computer memory and/or processors, an operating system that provides executable program instructions for the general administration and operation of that server, and a computer-readable medium storing instructions that, when executed by a processor of the server, allow the server to perform its intended functions.

The cloud provider network 120 can provide on-demand, scalable computing platforms to users through the network 104, for example allowing users to have at their disposal scalable "virtual computing devices" via their use of the block store servers 105, object storage servers 110, and compute servers 115. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

The cloud provider network 120 can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

Turning specifically to the roles of the different servers within the cloud provider network 120, the compute servers 115 include one or more servers on which provide resizable computing capacity to users for building and hosting their software systems. The compute servers 115 and associated control plane functionality can provide an elastic compute cloud service of the cloud provider network. Compute services can be referred to as a virtual compute service, or cloud compute service, in various implementations. Users can use the compute servers 115 to launch as many virtual computing environments, referred to as virtual compute instances, virtual machine instances, virtual machines, or "instances" 116, as they need. Instances 116 can have various configurations of processing power, memory, storage, and networking capacity depending upon user needs. The compute servers 115 can also include computer storage for temporary data used while an instance is running, however as soon as the instance is shut down this data is lost.

The block store servers 105 provide persistent data storage for the compute servers 115 in the form of block storage volumes 106, each of which represents a virtualized, network-accessible block-storage device (e.g., a virtual "hard disk"). Block storage may be referred to in various implementations as cloud disks service, a managed disk service, a storage area network service, a persistent disk service, or a block volumes service, while block storage volumes may variously be referred to as cloud disks, storage disks, cloud volumes, disks, block volumes, or simply "volumes." The block store servers 105 and associated control plane functionality can provide an elastic block store service of the cloud provider network 120. Data of volumes 106 may be encrypted or unencrypted.

The block store servers 105 include one or more servers on which data is stored as blocks. A block is a sequence of bytes or bits having a fixed length of the block size. Blocked data is normally stored in a data buffer and read or written a whole block at a time. Blocking can reduce overhead and speed up the handling of the data-stream. Each block is assigned a unique identifier by which it can be stored and retrieved, but typically is not assigned metadata providing further context. A block of data (also referred to herein as a "data block") can be, for example, 512 bytes, 1 kilobyte ("kB"), 4 kB, 8 kB, 16 kB, 32 kB, 64 kB, 128 kB, 256 kB, 512 kB, or larger, depending upon the implementation.

User volumes 106, which can be treated as an individual hard drive ranging for example from 1 GB to 1 terabyte TB (or more) in size, are made of one or more blocks stored on the block store servers 105. Although treated as an individual hard drive, it will be appreciated that a volume may be stored as one or more virtualized devices implemented on one or more underlying physical host devices. Volumes 106 may be partitioned a small number of times (e.g., up to 16) with each partition hosted by a device of the cloud provider network 120 that has the ability to transfer data at around 1 GB per second ("Gbps") in some implementations. These volumes provided persistent, dedicated storage that can be attached to particular instances of the compute servers 115. Each volume may be "attached" to an instance 116 running on a compute server 115, and can be detached from that instance 116 and re-attached to another. Attachment between a volume and an instance refers to the establishment of a connection between a client of the instance and the volume. This connection may be referred to as a "lease" in some implementations, and it enables to instance to view the volume as if it were a local storage drive, even though the volume and instance may be hosted on different physical machines and communicating over a network. Attachment may be facilitated, for example, by specialized hardware or software executing on compute servers 115 (which specialized hardware or software is sometimes referred to as a block store server "client") that operates to obtain mass storage operations (e.g., according to the Serial AT Attachment (SATA) protocol or other known storage protocols) and pass corresponding operations to the block storage services 105 for implementation, such that it appears from the point of view of an instance 116 that volumes 106 represent local disk drives. The client may be implemented on an offload card of a server that includes the processing units (e.g., CPUs or GPUs) of the compute instance. For example, in some implementations, at least a subset of virtualization management tasks may be performed at one or more offload cards so as to enable more of the processing capacity of the host to be dedicated to client-requested compute instances—e.g., cards connected via PCI or PCIe to the physical CPUs and other components of the virtualization host may be used for some virtualization management components. Such an offload card of the host can include one or more CPUs that are not available to customer instances, but rather are dedicated to instance management tasks such as virtual machine management, input/output virtualization to network-attached storage volumes, local migration management tasks, instance health monitoring, and the like. The block store servers 105 may have built-in redundancy for volumes by replicating the volume across multiple servers within an availability zone, which means that volumes will not fail if an individual drive fails or some other single failure occurs.

The object storage servers 110 represent another type of storage within the cloud provider network 120. The object storage servers 110 and associated control plane functionality can provide an object-based storage service of the cloud provider network. Object-based storage services can be referred to as a blob storage service, cloud object storage service, or cloud storage service, in various implementations. In contrast to block-based storage (e.g., where devices read and write fixed-length blocks identified by a location, such as a logical block address (LBA)), object storage services 110 facilitate storage of variable-length objects associated with a corresponding object identifier. Each object may represent, for example, a file submitted to the servers 110 by a user for storage (though the servers 110 may or may not store an object as a file). In contrast to block-based storage, where input/output (I/O) operations typically occur via a mass storage protocol like SATA (though potentially encapsulated over a network), interactions with the object storage servers 110 may occur via a more general network protocol. For example, the servers 110 may facilitate interaction via a Representational State Transfer (REST) application programming interface (API) implemented over the Hypertext Transport Protocol (HTTP). The object storage servers 110 may store objects within resources referred to as buckets 111. Each object typically includes the data being stored, a variable amount of metadata that enables various capabilities for the object storage servers 110 with respect to analyzing a stored object, and a globally unique identifier or key that can be used to retrieve the object. Objects stored on the object storage servers 110 are associated with a unique identifier, such that authorized access to them can be obtained through requests from networked computing devices in any location. Each bucket 111 is associated with a given user account. Users can store as many objects as desired within their buckets, can write, read, and delete objects in their buckets, and can control access to their buckets and the objects contained therein. Further, in embodiments having a number of different object storage servers 110 distributed across different ones of the regions described above, users can choose the region (or regions) where a bucket is stored, for example to optimize for latency. Users can use object storage servers 110 for purposes such as storing photos on social media websites, songs on music streaming websites, or files in online collaboration services, to name a few examples. Applications developed in the cloud often take advantage of the vast scalability and metadata characteristics of the object storage servers 110. The object storage servers 110 can support highly parallel data accesses and transfers. The object storage servers 110 can offer even greater redundancy than the block store servers 105, as the object storage servers 110 can automatically replicate data into multiple availability zones. The object storage servers 110 also have different data throughput than the block store servers 105, for example around 20 Mbps for a single stream of data.

While the object storage servers 110 can be used independently from the instances 116 and volumes 106 described above, they can also be used to provide data backup as described herein with respect to object-based snapshots (e.g., object-stored backups of volume data). For example, and as described in more detail below, data of a volume 106 may be represented as one or more objects stored within the object storage servers 110 (with each object representing one or more blocks of the volume 106) along with one or more manifests identifying the objects. Together, the objects and manifests can logically represent a point-in-time representation of the volume 106 referred to herein as an object-based snapshot.

As illustrated in FIG. 1, the cloud provider network 120 can communicate over network 104 with user computing devices 102. The network 104 can include any appropriate network, including an intranet, the Internet, a cellular network, a local area network or any other such network or combination thereof. In the illustrated embodiment, the network 104 is the Internet. Protocols and components for communicating via the Internet or any of the other aforementioned types of communication networks are known to those skilled in the art of computer communications and thus, need not be described in more detail herein. User computing devices 102 can include any network-equipped computing device, for example desktop computers, laptops, smartphones, tablets, e-readers, gaming consoles, and the like. Users can access the cloud provider network 120 via the network 104 to view or manage their data and computing resources, as well as to use websites and/or applications hosted by the cloud provider network 120.

Figure 2:
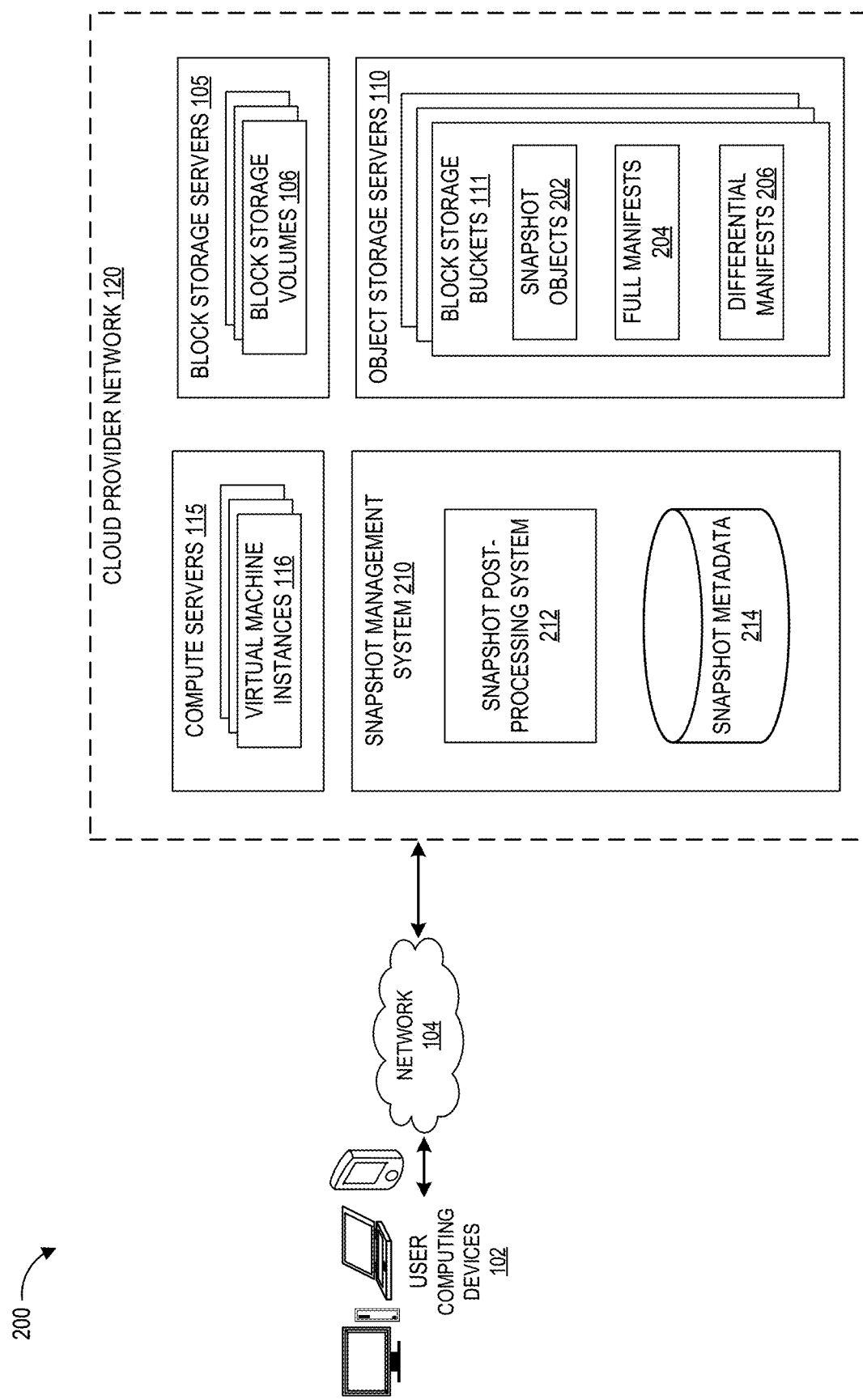
FIG. 2 depicts a schematic diagram of a network environment in which the cloud provider network of FIG. 1 implements efficient post-processing of object-based snapshots in accordance with aspects of the present disclosure.

FIG. 2 depicts a computing environment 200 in which snapshot management system 210 is implemented on the cloud provider network 120. The snapshot management system 210 can implement a variety of post-processing tasks with respect to snapshots stored on the object storage servers 110, including for example validation, garbage collection, and resource usage auditing. The tasks are illustratively implemented by the snapshot post-processing system 212. The system 212 may implement validation, for example, by inspecting current snapshots to ensure that objects representing data of the snapshot are accessible and not corrupted (e.g., due to random error in the servers 110). Garbage collection may occur by ensuring that snapshot-related objects stored on the servers 110 are in fact referenced by a non-deleted snapshot, or else deleting such snapshot-related objects. Resource usage auditing may occur by reviewing a given period of time, and determining a set of unique objects stored in relation each "active" snapshot (e.g., in a created and non-deleted state) during that period of time, with "unique" objects in this instance being those objects not stored in connection with a parent snapshot that is also active during the period of time. These tasks are referred to herein as "post-processing," as the tasks can be periodically implemented with respect to a snapshot after that snapshot has been created. The tasks may illustratively be implemented asynchronously to user-facing snapshot operations (e.g., creation of a snapshot from a volume 106, creation of a volume 106 from a snapshot, deletion or copying of a snapshot, etc.).

As will be appreciated by one skilled in the art, the above-noted post-processing tasks can be very important for proper operation of the network 120 (e.g., to ensure data validity and avoid excess resource usage). However, particularly when the number of snapshots stored on the object storage servers 110 is large, the volume of data required by the system 212 to conduct post-processing tasks can be non-trivial. For example, consider an instance in which snapshots are logically represented on the servers 110 as a set of snapshot objects 202 and full manifests 204. As discussed above, each snapshot object 202 may represent one or more blocks of a volume 106 that is stored as a distinct object on the object storage servers 110. Each full manifest 204 may correspond to a snapshot, and list a full set of the objects 202 that represent data of a volume 106 at a time of the snapshot (e.g., such that a combination of those objects identified in the manifest represents data of the volume 106). While the size of each full manifest 204 is significantly smaller than the objects 202 listed therein, such manifests 204 in aggregate can nevertheless represent large amounts of data. For example, in a production environment the total size of all full manifests 204 may be petabytes or more in size. As such, the post-processing system 212 would require extreme amounts of bandwidth to retrieve all full manifests 204 and correspondingly large amounts of computing resources to perform operations, such as deduplication, on those manifests 204 that might be required for post-processing tasks.

In accordance with embodiments of the present disclosure, resource usage of the snapshot post-processing system 212 is significantly reduced by storing within the servers 110 a set of differential manifests 206. In contrast to full manifests 204, a differential manifest 206 may list, for an incremental snapshot, a set of the objects 202 that are associated with the incremental snapshot but not with a parent snapshot. For example, if a first snapshot is logically represented by a set of objects {$A_1$, $B_1$, $C_1$}, and a second snapshot is represented by objects {$A_1$, $B_2$, $C_1$}, with $B_2$ representing a different object than $B_1$, the differential manifest 206 for the second snapshot may list only object $B_2$. A differential manifest 206 on average can be expected to be significantly smaller than a corresponding full manifest 204. Thus, retrieval of differential manifests 206 can be significantly less resource intensive than retrieval of full manifests 204. Moreover, in accordance with embodiments of the present disclosure, the snapshot post processing system 212 can be configured to conduct post-processing tasks by retrieving full manifests 204 for non-incremental snapshots and differential manifests 206 for incremental snapshots. By retrieval of differential manifests 206 for incremental snapshots, the total amount of data retrieved and processed by the system 212 can be significantly reduced. For example, in one test environment, the total amount of data retrieved by the system 212 when retrieving differential manifests 206 for incremental snapshots was reduced by nearly 75% relative to retrieving full manifests 206 for all snapshots. Thus, use of a combination of full manifests 204 and differential manifest 206 can represent a significant improvement in operation of the snapshot management system 210.

To facilitate identification of incremental and non-incremental snapshots, the snapshot management system 210 further includes snapshot metadata 214. The metadata 214 may be stored, for example, as data within a relational database. Illustratively, the metadata 214 may include, for each snapshot, an indication of whether the snapshot is incremental relative to another active snapshot, or non-incremental (e.g., not a child to any active snapshot). The metadata 214 may also include other information, such as a volume represented by the snapshot, a point-in-time of creation of the snapshot, an owner of the snapshot, an active time of the snapshot, identification of a parent snapshot, a number of objects that represent the snapshot, a number of unique objects relative to a parent snapshot (if any), etc. As discussed in more detail below, the snapshot post-processing system 212 may be configured to identify incremental and non-incremental snapshots using the snapshot metadata 214, to retrieve differential manifests 206 and full manifests 204, respectively, for these and non-incremental snapshots, and then to conduct post-processing tasks with respect to objects corresponding to the snapshots.

Figure 3:
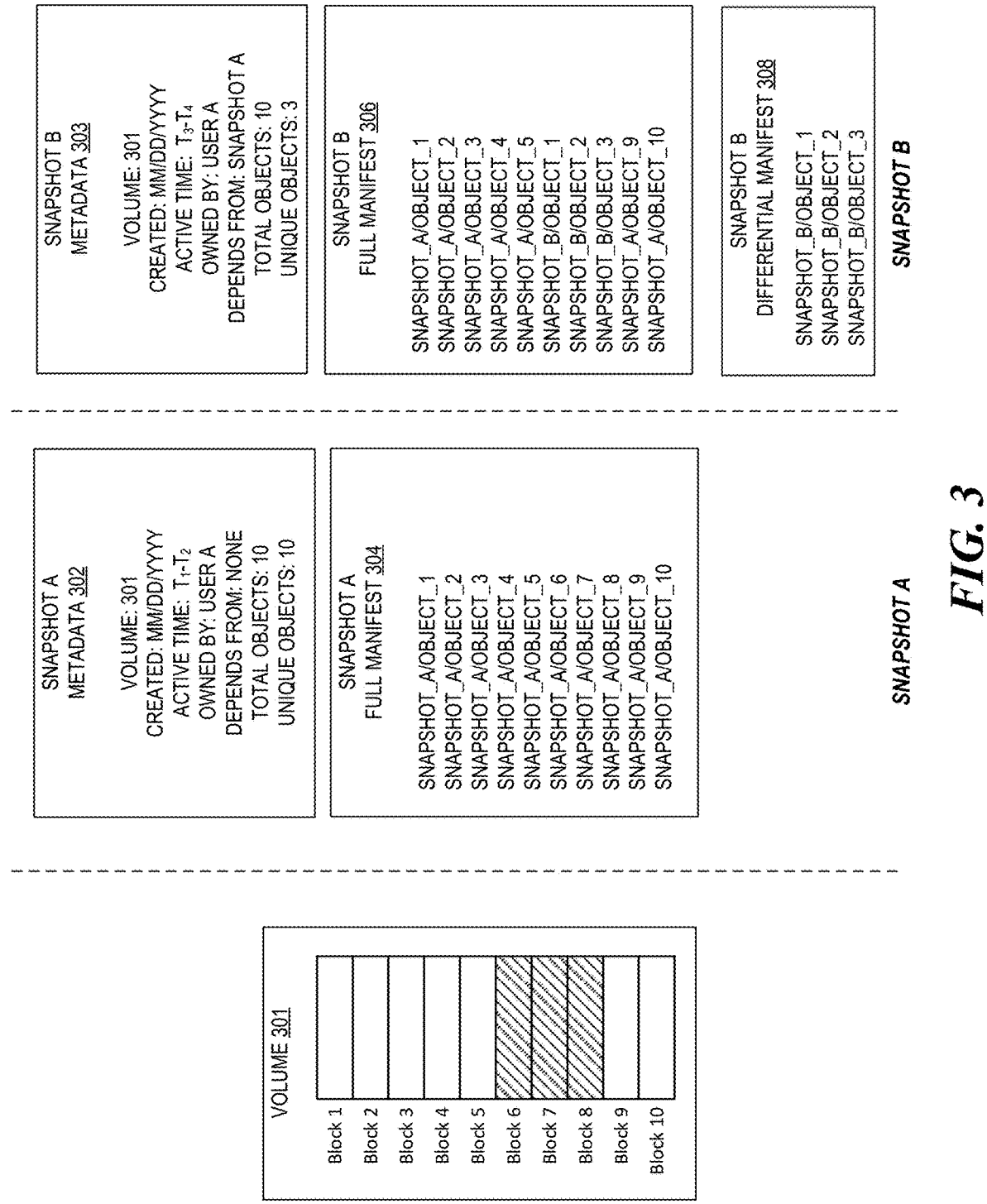
FIG. 3 is an illustrative visualization of a block-storage volume and two snapshots of that block-storage volume, each snapshot logically represented by a set of snapshots objects and one or more manifests listing such snapshot objects.

To further illustrate the concept of full and differential manifests, FIG. 3 provides an illustrative visualization of a volume 301 and two snapshots of that volume 301, identified in FIG. 3 as Snapshot A and Snapshot B. The volume 301 may represent a block-based storage volume, such as a volume 106 of FIG. 1. As shown in FIG. 3, the volume 301 includes a number of blocks, each corresponding to a fixed-length segment of bits (e.g., 512 KB in length). While 10 blocks are shown in FIG. 3, a volume may be associated with any number of blocks, and the representation of FIG. 3 is simplified for ease of description and depiction.

A user associated with the volume 301 may illustratively create the volume 301 in an initial state (with blocks 1-10 containing some initial set of data defined by the user), and then take a snapshot of the volume 301. As a result, a set of objects may be created on the object storage service 110 that contain the data of the volume 301 in the initial state. In FIG. 3, each block of the volume 301 is illustratively represented by a single object in the object storage service 110. Thus, block 1 is represented as "object 1", block 2 is represented as "object 2", etc. The network 120 generates a full manifest 304 that lists the objects making up the data of the volume 301 in the initial state. Each object may be identified as a location on the object storage service 110, e.g., "object 1" within the directory "snapshot a." Thus, by obtaining the manifest 304 and the objects identified therein, a system may re-create the initial state of the volume 301.

Notably, the object-based snapshots illustrated in FIG. 3 differ significantly from other snapshot techniques, such as disk-based snapshots. As used herein, the term "disk-based snapshot" is intended to refer to a snapshot technique in which pointers on a storage device are used to enable reversion of a volume to a prior state, without requiring copying of data of the volume. For example, with a disk-based snapshot, a system may map blocks of a volume to specific portions of a storage device. When a snapshot is taken, the system may create a reference to portions of the storage device that contain data of the volume at that point in time, and disallow writing to those portions. Rather, subsequent writes to the volume are stored in another location of the storage device, and the system re-maps written blocks of the volume to the other locations. In this manner, the volume can be reverted to the prior point in time by reverting the mapping of the later-written blocks, such that the mapping refers back to the portion of the storage device that held data of the blocks prior to the writes. Disk-based snapshots do have some advantages over object-based snapshots, such as avoiding a need to copy data of the volume when a snapshot is created. However, these advantages are significantly outweighed in a cloud environment by corresponding disadvantages, such as lack or portability or resiliency. Thus, the term "snapshot" as used herein is generally intended to refer to object-based snapshots, in which data of a volume is replicated to a set of objects stored separately from the volume, in contrast to disk-based snapshots.

FIG. 3 further depicts a second snapshot of the volume 301, Snapshot B. This second snapshot is illustratively created after modification to blocks 6-8 of the volume 301, which blocks are shown in FIG. 3 as shaded. Because only 3 of the 10 blocks of the volume 301 have been modified, the full manifest 306 of Snapshot B significantly overlaps with the full manifest 304 of Snapshot A, with both manifests 304 and 306 identifying the same "snapshot a/object 1," "snapshot a/object 2," etc. However, because blocks 6-8 of volume 301 were modified subsequent to creation of Snapshot A, the full manifest 306 of Snapshot B includes new objects "snapshot b/object 1," "snapshot b/object 2," and "snapshot b/object 3," in place of objects 6-8 of Snapshot A, which new objects represent the modified blocks 6-8.

To more specifically identify those objects that are unique to Snapshot B relative to Snapshot A, FIG. 3 further illustrates a differential manifest 308 for Snapshot B, listing only new objects "snapshot_b/object_1," "snapshot_b/object_2," and "snapshot_b/object_3." The differential manifest 308 is therefore significantly smaller than the full manifest 306. Thus, to identify the set of unique objects among both Snapshots A and B, the full manifest 304 of Snapshot A can be combined with the differential manifest 308 of Snapshot B. As such, the additional information of Snapshot B's full manifest 306 need not be retrieved or processed.

FIG. 3 further illustrates metadata 302 and 303 of Snapshots A and B, respectively. As discussed above, metadata of each snapshot can facilitate identification of the snapshot as incremental or non-incremental. For example, the metadata 302 of Snapshot A indicates that the snapshot does not depend from another snapshot, while the metadata 303 of Snapshot B indicates that Snapshot B depends from Snapshot A. Accordingly, a system inspecting the metadata 302 and 303 may determine that, in identifying unique objects among the two snapshots, the full manifest 304 of non-incremental Snapshot A should be retrieved, while the differential manifest 308 of incremental Snapshot B should be retrieved. The metadata of each snapshot may further include additional information, such as identification of the volume 301, a data of creation of each snapshot, an active time of each snapshot (e.g., until deletion), an owner of the snapshot, a total number of objects of the snapshot, and a total number of unique objects of the snapshot (e.g., the number of objects listed in a differential manifest).

Figure 4:
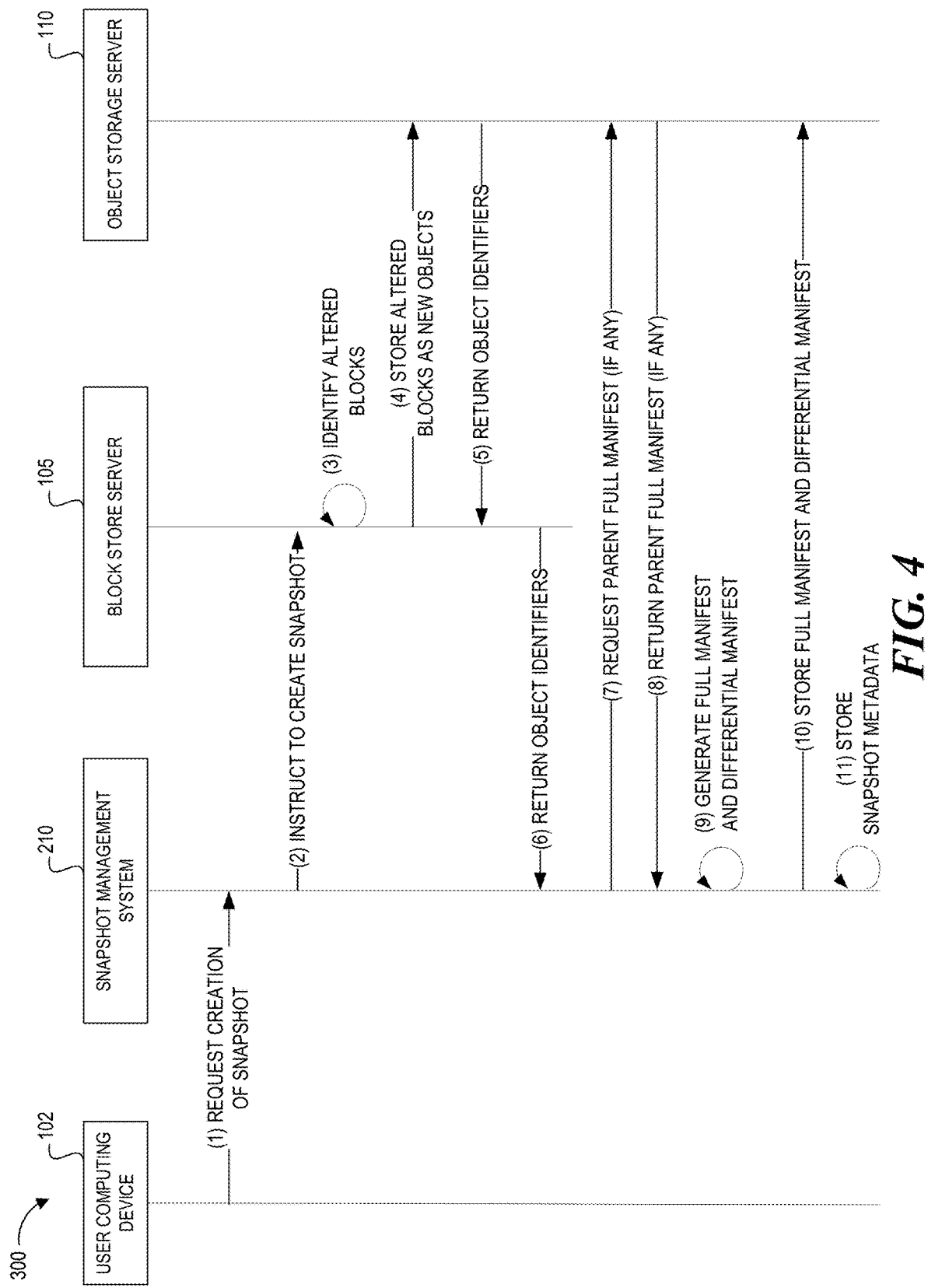
FIG. 4 depicts illustrative interactions on the cloud provider network of FIG. 1 to create a snapshot from a block-storage volume, including creation of full and differential manifests for the snapshot.

With reference to FIG. 4, illustrative interactions will be described for creation of a snapshot within the network 120 of FIG. 1, including creation of both full and differential manifests for the snapshot in accordance with embodiments of the present disclosure. The interactions begin at (1), where a user computing device 102 transmits to the snapshot management system 210 a request to create a snapshot. The system 210, in turn, transmits an instruction to the block store server 105 to create the snapshot, at (2).

On receiving the instruction, the block store server 105, at (3), identifies blocks altered since a prior snapshot. For example, the server 105 may maintain a listing of "dirty blocks," which listing is cleared on creation of a snapshot for a volume and updated as blocks are written to. These "dirty" blocks may thus represent blocks altered since a prior snapshot. If no prior snapshot has been taken, all blocks written to the volume may be considered altered. The server 105 then, at (4), stores the altered blocks as new objects on the object storage server 110. The server 110, in return, provides identifiers of the new objects to the block storage servers 105 at (5). At (6), these object identifiers are returned to the snapshot management system 210.

Having obtained the identifiers for objects representing altered blocks, the snapshot management system 210, at (7), requests from the object storage server 110 the manifest of a parent snapshot, if any. Illustratively, the snapshot management system 210 may inspect metadata maintained by the system to identify a prior snapshot of the volume, if any, and thus request that snapshot from the server 110. The parent manifest is then returned at (8).

Thereafter, at (9), the snapshot management system 210 generates a both a full and a differential manifest for the snapshot. Specifically, to generate a full manifest, the system 210 creates a data structure (e.g., a text file) including the object identifiers for those objects representing altered blocks, as returned at (6), as well as object identifiers for unaltered blocks, as identified within the parent manifest (if any). If the snapshot is incremental (e.g., if a parent snapshot exists), the system 210 further generates a differential manifest that identifies only object identifiers for those objects representing altered blocks, as returned at (6), without the object identifiers for unaltered blocks. If the snapshot is not incremental, the system 210 may decline to create a differential manifest, or may generate an empty differential manifest. Where an empty differential manifest is created for a non-incremental snapshot, the system 210 may further store an indication (e.g., as metadata for the snapshot) that the snapshot is non-incremental, to for example distinguish such empty manifests from those manifests created when a snapshot is entirely duplicative of a parent snapshot. Examples full manifests and an example differential manifest are discussed above with reference to FIG. 4.

In addition, at (11), the system 210 stores metadata regarding the new snapshot. The metadata illustratively identifies the new snapshot as incremental or non-incremental, depending on whether a prior snapshot of the volume served as a basis for the new snapshot. The metadata may include additional information, a discussed above. Accordingly, by reference to the metadata for the snapshot, the system 210 may determine whether to use a differential or a full manifest when conducting post-processing operations with respect to the snapshot, in accordance with embodiments of the present disclosure.

Figure 5A:
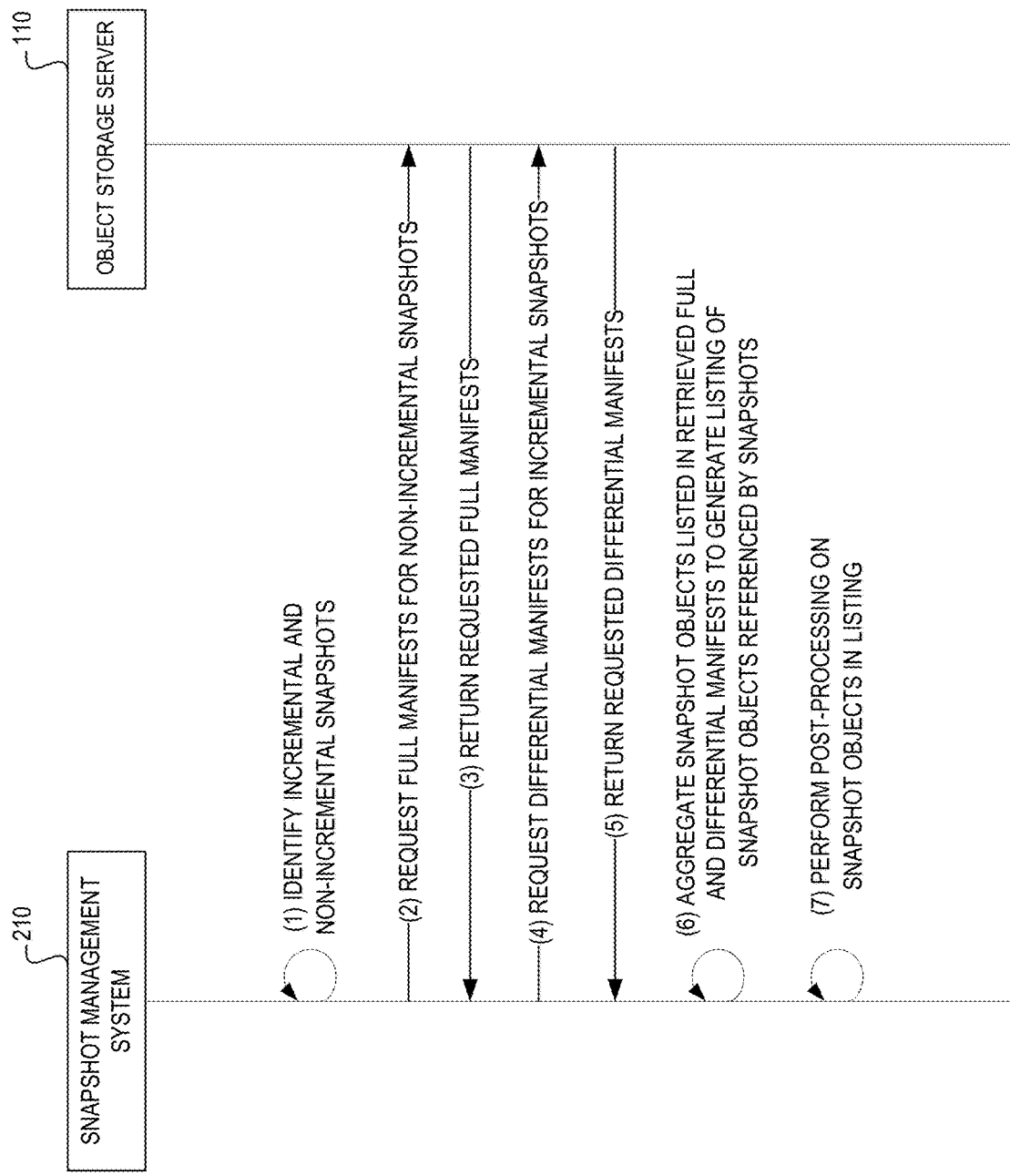
FIG. 5A depicts illustrative interactions on the cloud provider network of FIG. 1 to conduct post-processing on snapshot objects stored by the cloud provider network based on a listing of snapshot objects referenced in manifests of object-based snapshots.
Figure 5B:
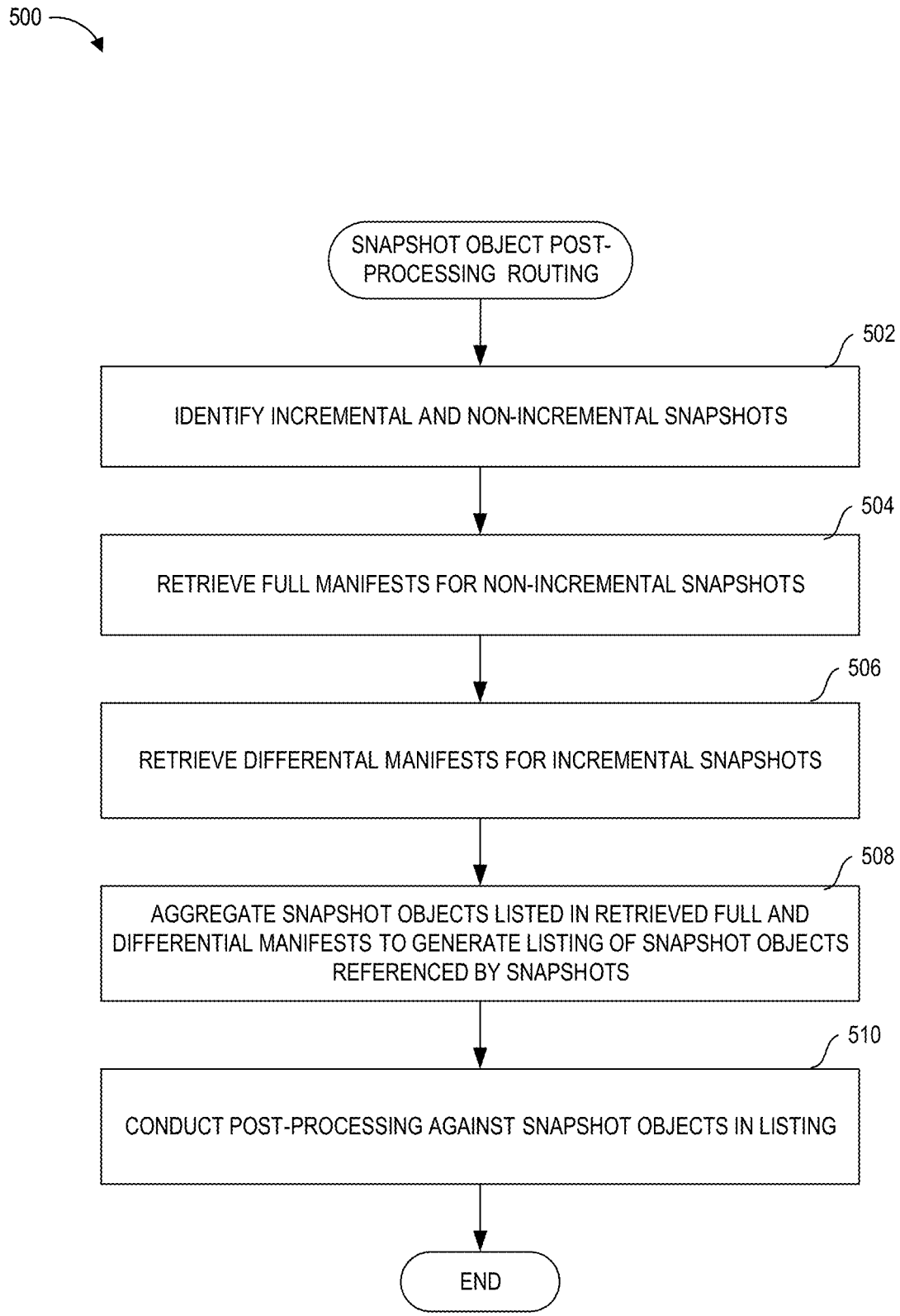
FIG. 5B depicts an illustrative routine implemented on the cloud provider network of FIG. 1 to facilitate the interactions of FIG. 5A.

With reference to FIGS. 5A and 5B, illustrative interactions and a corresponding routine will be described for performing post-processing on snapshot objects, such as snapshot objects 202, in accordance with embodiments of the present disclosure. Specifically, FIG. 5A depicts interactions of the snapshot management system 210 and an object storage server 110 to perform post-processing, while FIG. 5B depicts a corresponding routine 500 that may be implemented by the snapshot management system 210 to perform the interactions of FIG. 5A.

The routine 500 of FIG. 5B begins at block 502, shown as interaction (1) of FIG. 5A, where the snapshot management system 210 identifies a set of incremental and non-incremental snapshots. In one embodiment, the system 210 may identify all snapshots maintained by the system 210, and determine whether each such snapshot is incremental or non-incremental. In other embodiments, the system 210 may identify both incremental and non-incremental snapshots meeting certain criteria, such as being active during a given point in time. The criteria may be set, for example, based on the post-processing task to be conducted. For example, when auditing resource usage of snapshot objects, the system 210 may identify snapshots (e.g., both incremental and non-incremental) that are 'active' (e.g., created and not deleted) during a given period of time for which resource usage is to be audited. Somewhat similarly, when conducting garbage collection, the system 210 may identify all snapshots that were active as of a past point in time (e.g., one week prior), such that the garbage collection process deletes or archives snapshot objects created prior to that point in time that are not referenced within the manifests of any identified snapshots (e.g., because all manifests that referenced such objects have been deactivated). With respect to validation, the system 210 may identify all currently active snapshots in order to identify a set of objects to test for validity. The system 210 may illustratively maintain a list of active snapshots (e.g., within snapshot metadata 214) during a variety of time periods (e.g., currently active snapshots, active snapshots during one or more past time periods, etc.) to facilitate this identification.

In some embodiments, whether a snapshot is incremental or non-incremental is a fixed attribute determined at creation of the snapshot. In other instances, whether a snapshot is incremental or non-incremental may vary over time. For example, a child snapshot that is initially incremental with respect to a parent snapshot may later be deemed non-incremental by severing a link to that parent. Such severing may occur, for example, on deletion of the parent snapshot. In one embodiment, the system 210 may maintain relationship information for a parent snapshot to facilitate such severing, such as a reverse dependency list for the parent snapshot (e.g., a list of snapshots that depend on the parent snapshot). Thus, identification of incremental and non-incremental snapshots may take into account a relevant time period. For example, when the identified snapshots are those active at a given point in time, the system may identify those snapshots as incremental or non-incremental at that given point in time. Furthermore, in some embodiments whether a given snapshot is incremental or non-incremental may vary based on whether a prior hierarchical snapshot is associated with the same user account of the given snapshot. For example, the system 210 may enable a first user to generate a first snapshot based on a second snapshot of a second user. While the snapshot of a second user may be logically equivalent to a parent of the second snapshot, the system 210 may "break" this dependency due to the two snapshots being associated with different users (assumed in this example to be associated with different accounts). Thus, whether a snapshot is incremental or non-incremental may depend in part on whether a prior hierarchical snapshot is associated with the same account on the system 210. As discussed above, the system 210 may illustratively identify snapshots based on metadata (e.g., the snapshot metadata 214) that identifies whether a given snapshot is incremental to another snapshot, such as by being a "child" snapshot created at a point-in-time after a "parent" snapshot of the same volume.

Thereafter, the routine 500 proceeds to block 504, where the system 210 retrieves full manifests for the identified non-incremental snapshots. Block 504 is shown as interactions (2) and (3) of FIG. 5A, in which the system 210 at (2) requests full manifests for non-incremental snapshots from the object storage server 110, and the server 110 responds at (3) with those requested full manifests. Similarly, at block 506, the system 210 retrieves differential manifests for incremental snapshots. Block 506 is shown as interactions (4) and (5) of FIG. 5A, in which the system 210 at (4) requests differential manifests for incremental snapshots from the object storage server 110, and the server 110 responds at (5) with those requested differential manifests.

As discussed above, a full manifest generally includes a full listing of a set of objects on the server 110 are sufficient to restore the volume to the point-in-time at which the snapshot was taken (e.g., that collectively represent data of the volume). In contrast, a differential manifest generally identifies objects on the server 110 that are unique to the incremental snapshot relative to a parent snapshot. Thus, differential manifests are expected in many or most instances to list fewer objects than a full manifest for the same snapshot. Accordingly, retrieval of the differential manifests, at block 506 and interactions (4) and (5), can be expected to require fewer computing resources (e.g., bandwidth, memory, and processing power) than would retrieval of full manifests for the identified incremental snapshots. Particularly at large scale (which scales are typical of major cloud service providers), this reduction in resource usage can be significant.

The routine 500 then proceeds to block 506, shown as interaction (6) of FIG. 5A, where the system 210 aggregates the snapshot objects listed in the retrieved full and differential manifests to generate a listing of snapshot objects referenced by the snapshots identified at block 502. This listing can then be used as a basis for post-processing, which the system 210 conducts at block 508 (shown as interaction (7) of FIG. 5A). For example, when conducting validation, the system 210 may validate each snapshot object in the listing, such as by verifying the object can be read on the server 110, computing a hash of the object and comparing that hash to an expected value, etc. The system 210 may thus ensure that a user attempting to use a snapshot would not encounter an error when doing so. When conducting garbage collection, the system 210 may compare a set of snapshot objects store on the server 110 (e.g., those not accessed within a past time period) to the listing of snapshot objects 110 referenced by snapshots to identify one or more objects stored on the server 110 but not referenced by the manifests of any of the snapshots. These one or more objects may then be deleted, archived, etc. When conducting resource usage auditing, the system 210 may obtain usage information associated with each object, and attribute such usage to an owner of the corresponding snapshot. Thus, post-processing can occur with respect to the generated listing, without requiring retrieval of the full manifests for each snapshot and thus without incurring the resource usage that would occur for retrieval of the full manifests for each snapshot.

Embodiments of the present disclosure may further provide for decreased computing resources usage in instances in which the system 210 deduplicates the listing of snapshot objects (which deduplication may occur, for example, as part of aggregation at block 508). More specifically, because the differential manifests contain a listing of unique objects relative to a parent snapshot, as opposed to all objects including those referenced by a parent snapshot, the total number of duplicate listings of an object is reduced. Deduplication of the aggregate listing is therefore simplified, reducing both the memory and computation required to detect and remove duplicate objects in the aggregate listing.

In some instances, still further computing resource savings may occur in configurations in which the snapshot management system 210 is implemented as a distributed computing system. Use of such a distributed computing system may be desirable when the total amount of data processed by the routine 500 is large (e.g., on the order of terabytes or petabytes). A variety of mechanisms exist to coordinate multiple computing devices to act as a distributed system and to conduct various tasks, such as aggregating multiple files and deduplicating entries in such files. For example, the MapReduce programming model is a known model in which a set of devices first "map" input data by sorting the input data onto a set of values, which values are then redistributed (according to a given sorting mechanism) to devices implementing a "reduce" function, to combine the sorted values into a final output. In the context of the present disclosure, distributed computing may be used by the system 210 such that multiple devices independently implement blocks 502-506, for example, and then interact with one another to aggregate the retrieved manifests into the listing (including potentially deduplicating that listing). For example, multiple devices of the system 210 may implement a "map" function on their respective retrieved manifests, and then redistribute identifiers of objects in those manifests among the devices according to a sorting algorithm (e.g., a hash of the identifiers). Each device may then implement a "reduce" function to deduplicate their received identifiers. The outputs of each reduce function could then be combined into a deduplicated listing of snapshot objects referenced by the manifests.

One issue with use of distributed computing processes, like those described above, is that they generally require some type of communication between devices. For example, in the MapReduce model, a "shuffling" typically occurs between map and reduce functions, where data is redistributed between devices according to a sorting mechanism. As the amount of data processed increases, the amount of communication between devices generally also increases. Were the system 210 to simply obtain full manifests for all snapshots, the total number of object references in all manifests would be expected to increase significantly, and distributed computing processes such as those discussed above would also require significantly more computing resources. By use of differential manifests for incremental snapshots, as described herein, the amount of initial data retrieved by the system 210 can be reduced, thus saving resources with respect to retrieval as noted above. Furthermore, this reduction in initial data retrieved in turn reduces communications and processing required to implement distributed computing processes, providing even more resource savings. The embodiments described herein may therefore be particularly beneficial when applied in distributed computing systems.

Figure 6:
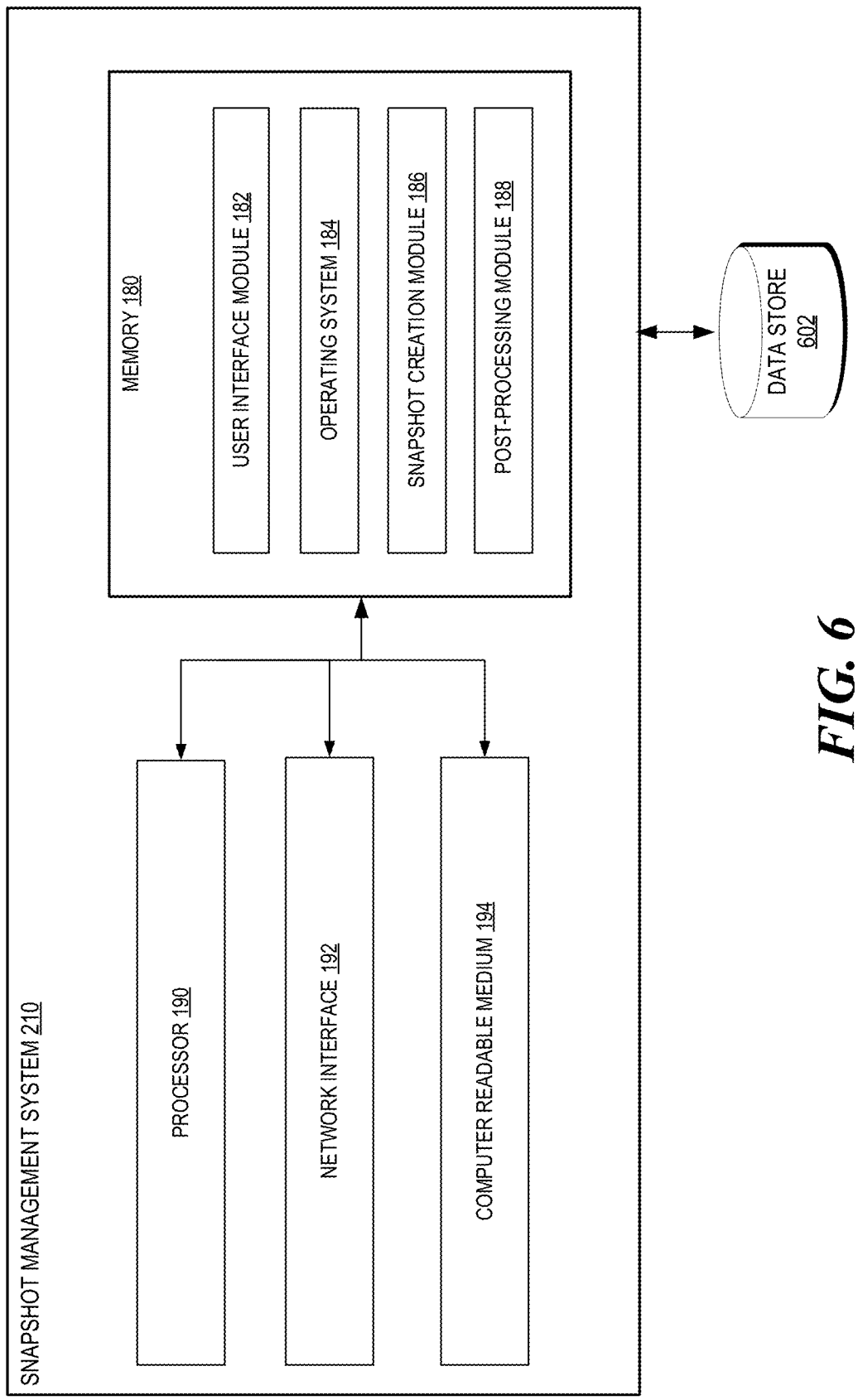
FIG. 6 depicts a general architecture of a computing device or system providing snapshot management in accordance with aspects of the present disclosure.

FIG. 6 depicts an example architecture of a computing system (referred to as the snapshot management system 210) that can be used to perform one or more of the techniques described herein or illustrated in FIGS. 1-5B. The general architecture of the snapshot management system 210 depicted in FIG. 6 includes an arrangement of computer hardware and software modules that may be used to implement one or more aspects of the present disclosure. The snapshot management system 210 may include many more (or fewer) elements than those shown in FIG. 6. It is not necessary, however, that all of these elements be shown in order to provide an enabling disclosure. As illustrated, the snapshot management system 210 includes a processor 190, a network interface 192, and a computer readable medium 194, all of which may communicate with one another by way of a communication bus. The network interface 192 may provide connectivity to one or more networks or computing systems. The processor 190 may thus receive information and instructions from other computing systems or services via the network 104 illustrated in FIGS. 1 and 2.

The processor 190 may also communicate with memory 180. The memory 180 may contain computer program instructions (grouped as modules in some embodiments) that the processor 190 executes in order to implement one or more aspects of the present disclosure. The memory 180 may include random access memory (RAM), read only memory (ROM), and/or other persistent, auxiliary, or non-transitory computer-readable media. The memory 180 may store an operating system 184 that provides computer program instructions for use by the processor 190 in the general administration and operation of the public snapshot service 130. The memory 180 may further include computer program instructions and other information for implementing one or more aspects of the present disclosure. For example, in one embodiment, the memory 180 includes a user interface module 182 that generates user interfaces (and/or instructions therefor) for display upon a user computing device, e.g., via a navigation and/or browsing interface such as a browser or application installed on the user computing device.

In addition to and/or in combination with the user interface module 182, the memory 180 may include a snapshot creation module 186 and a post-processing module 188 that may be executed by the processor 190. In one embodiment, the snapshot creation module 186 and the post-processing module 188 when executed implements various aspects of the present disclosure, e.g., creating snapshots including full and differential manifests, generating a listing of objects referenced by snapshots, conducting post-processing with respect to those objects, and/or other aspects discussed herein or illustrated in FIGS. 1-5B.

In addition, the memory 180 may include or communicate with one or more data stores, such as the data store 602, which may be any persistent or substantially persistent data store (e.g., one or more hard disk drives, solid state drives, network accessible storage, a storage area network, or any number of data stores known in the art). The data store 602 may illustratively store snapshot metadata 214.

While the snapshot creation module 186 and post-processing module 188 are shown in FIG. 6 as part of the snapshot management system 210, in other embodiments, all or a portion of the snapshot creation module 186 and post-processing module 188 may be implemented by other components of the cloud provider network 120 and/or another computing device. For example, in certain embodiments of the present disclosure, another computing device in communication with the cloud provider network 120 may include several modules or components that operate similarly to the modules and components illustrated as part of the snapshot management system 210. In some instances, the snapshot management system 210 may be implemented as one or more virtualized devices, such as one or more instances 116 on the compute servers 115. Moreover, as noted above, the snapshot management system 210 may be implemented in whole or part as a distributed computing system including a collection of devices that collectively implement the functions discussed herein.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A system for conducting post-processing of a plurality of object-based snapshots of at least two distinct block-storage volumes, each object-based snapshot representing data of a corresponding block-storage volume at a point-in-time, the system comprising:
   one or more hardware storage devices comprising:
      a metadata store storing metadata identifying individual object-based snapshots of the plurality of object-based snapshots as incremental or non-incremental, wherein an incremental object-based snapshot is associated with a parent object-based snapshot that represents an earlier state of the block-storage volume corresponding to the incremental object-based snapshot, and wherein a non-incremental object-based snapshot is not associated with a parent object-based snapshot; and
      an object data store including:
         snapshot objects, each snapshot object representing one or more blocks of data;
         full manifests, each full manifest corresponding to an object-based snapshot of the plurality of object-based snapshots and including a full listing of snapshot objects within the data store that collectively represent data of the corresponding block-storage volume at the point-in-time of the object-based snapshot; and
         one or more differential manifests, each differential manifest corresponding to an incremental object-based snapshot of the plurality of object-based snapshots that depends on a prior object-based snapshot, and including a listing of snapshot objects unique to the incremental object-based snapshot relative to the prior object-based snapshot; and
   one or more processors configured to:
      generate a listing identifying those snapshot objects, within the data store including snapshot objects, that are referenced by any one or more of the plurality of object-based snapshots by:
         identifying from the metadata a first set of object-based snapshots corresponding to any object-based snapshots, within the plurality of object-based snapshots, that are non-incremental;
         retrieving from the object data store a set of full manifests corresponding to the first set of object-based snapshots, corresponding to any object-based snapshots, within the plurality of object-based snapshots, that are non-incremental;
         identifying from the metadata a second set of object-based snapshots corresponding to any object-based snapshots, within the plurality of object-based snapshots, that are incremental;
         retrieving from the object data store a set of differential manifests corresponding to the second set of object-based snapshots, corresponding to any object-based snapshots, within the plurality of object-based snapshots, that are incremental; and
         aggregating snapshot objects listed within the set of full manifests, corresponding to any object-based snapshots, within the plurality of object-based snapshots, that are non-incremental, with snapshot objects listed within the set of differential manifests, corresponding to any object-based snapshots, within the plurality of object-based snapshots, that are incremental, to result in the listing identifying those snapshot objects, within the data store including snapshot objects, that are referenced by any one or more of the plurality of object-based snapshots; and
      conduct post-processing of the object-based snapshots by use of the listing identifying those snapshot objects within the object data store that are referenced by any one or more of the object-based snapshots.

2. The system of claim 1, wherein the post-processing includes at least one of validating snapshot objects within the listing, conducting garbage collection on the snapshot objects within the listing, or conducting a resource usage audit with respect to the snapshot objects within the listing.

3. The system of claim 1, wherein the block-storage volume represents a virtual hard disk drive hosted by a block storage system distinct from the object data store.

4. The system of claim 1, wherein the one or more processors represent a distributed computing system collectively configured to generate the listing of snapshot objects.

5. A computer-implemented method comprising:
   generating a listing identifying those snapshot objects, within a data store including snapshot objects, that are referenced by any one or more object-based snapshots of a plurality of object-based snapshots of at least two distinct block-storage volumes, each object-based snapshot representing data of a corresponding block-storage volume at a point-in-time as a collection of snapshot objects stored in the data store that provide a copy of data of the block-storage volume at the point-in-time, wherein generating the listing comprises:
      identifying a first subset of the plurality of object-based snapshots corresponding to all object-based snapshots, within the plurality object-based snapshots, that are non-incremental, wherein a non-incremental object-based snapshot is not associated with a parent object-based snapshot;
      retrieving a set of full manifests corresponding to the first subset of object-based snapshots, each full manifest including a full listing of snapshot objects within the data store that collectively represent data of the corresponding block-storage volume at the point-in-time of the object-based snapshot;
      identifying a second subset of the set of object-based snapshots corresponding to all object-based snapshots, within the plurality object-based snapshots, that are incremental, wherein an incremental object-based snapshot is associated with a parent object-based snapshot that represents an earlier state of the block-storage volume corresponding to the incremental object-based snapshot;
      retrieving a set of differential manifests corresponding to the second subset of object-based snapshots, each differential manifest corresponding to an incremental object-based snapshot, of the second subset, that depends on a prior object-based snapshot, and including a listing of snapshot objects unique to the incremental object-based snapshot relative to the prior object-based snapshot; and aggregating snapshot objects listed within the set of full manifests, corresponding to all object-based snapshots, within the plurality of object-based snapshots, that are non-incremental, with snapshot objects listed within the set of differential manifests, corresponding to all object-based snapshots, of the set of object-based snapshots, that are incremental to result in the listing identifying those snapshot objects within the data store that are referenced by any one or more object-based snapshots of the plurality of object-based snapshots; and conducting post-processing of the set of object-based snapshots by use of the listing identifying those snapshot objects within the data store that are referenced by any one or more object-based snapshots of the plurality of object-based snapshots.

6. The computer-implemented method of claim 5, wherein aggregating snapshot objects listed within the set of full manifests with snapshot objects listed within the set of differential manifests comprises implementing a MapReduce operation comprising on a distributed computing system, the MapReduce operation including a reshuffling of information between devices of the distributed computing system during generation of the listing of snapshot objects within the data store that are referenced by any one or more object-based snapshots of the set of object-based snapshots.

7. The computer-implemented method of claim 5 further comprising de-duplicating the listing of snapshot objects that are referenced by any one or more object-based snapshots of the set of object-based snapshots.

8. The computer-implemented method of claim 5, wherein individual object-based snapshots can be inactive or active, and wherein identifying the second set of object-based snapshots that are incremental comprises identifying that the second set of object-based snapshots that are associated with an active parent object-based snapshot at a given point-in-time.

9. The computer-implemented method of claim 5, wherein identifying the first subset of the set of object-based snapshots that are non-incremental comprises inspecting metadata of the set of object-based snapshots, the metadata identifying a state of each of the set of object-based snapshots as incremental or non-incremental.

10. The computer-implemented method of claim 9, wherein the metadata identifies each of the set of object-based snapshots as incremental or non-incremental by identifying whether each of the set of object-based snapshots depends on a prior object-based snapshot and identifying an active time period of the prior object-based snapshot.

11. The computer-implemented method of claim 9, wherein conducting post-processing of the set of object-based snapshots by use of the listing of snapshot objects that are referenced by any one or more object-based snapshots of the set of object-based snapshots comprises validating each snapshot object within the listing by attempting to read data of each snapshot object.

12. The computer-implemented method of claim 9, wherein conducting post-processing of the set of object-based snapshots by use of the listing of snapshot objects that are referenced by any one or more object-based snapshots of the set of object-based snapshots comprises conducting garbage collection by deleting snapshot objects that are stored within a data store and not included within the listing.

13. The computer-implemented method of claim 9, wherein the sets of full and differential manifest are stored on a network data store, and wherein retrieving the sets of full and differential manifests comprises transferring the sets of full and differential manifests over a network.

14. One or more non-transitory computer-readable media comprising computer-executable instructions that, when executed by a computing system, cause the computing system to:

generate a listing identifying those snapshot objects, within a data store including snapshot objects, that are referenced by any one or more object-based snapshots of a plurality of object-based snapshots of at least two distinct block-storage volumes, each object-based snapshot representing data of a corresponding block-storage volume at a point-in-time as a collection of snapshot objects that provide a copy of data of the block-storage volume at the point-in-time, wherein generating the listing comprises:

identifying a first subset of the plurality of object-based snapshots corresponding to each object-based snapshot, within the plurality object-based snapshots, that is non-incremental, wherein a non-incremental object-based snapshot is not associated with a parent object-based snapshot;

retrieving a set of full manifests corresponding to the first subset of object-based snapshots, each full manifest including a full listing of snapshot objects that collectively represent data of the corresponding block-storage volume at the point-in-time of the object-based snapshot;

identifying a second subset of the set of object-based snapshots corresponding to each object-based snapshot, within the plurality object-based snapshots, that is incremental, wherein an incremental object-based snapshot is associated with a parent object-based snapshot that represents an earlier state of the block-storage volume corresponding to the incremental object-based snapshot;

retrieving a set of differential manifests corresponding to the second subset of object-based snapshots, each differential manifest corresponding to an incremental object-based snapshot, of the second subset, that depends on a prior object-based snapshot, and including a listing of snapshot objects unique to the incremental object-based snapshot relative to the prior object-based snapshot; and aggregating snapshot objects listed within the set of full manifests, corresponding to each object-based snapshot, within the plurality object-based snapshots, that is non-incremental, with snapshot objects listed within the set of differential manifests, corresponding to each object-based snapshot, within the plurality object-based snapshots, that is incremental to result in the listing identifying those snapshot objects that are referenced by any one or more object-based snapshots of the plurality of object-based snapshot; and conducting post-processing of the object-based snapshots by use of the listing identifying those snapshot objects within the data store that are referenced by any one or more of the plurality of object-based snapshots.

15. The one or more non-transitory computer readable media of claim 14, wherein individual object-based snapshots can be inactive or active, and wherein identifying the first subset of object-based snapshots that are non-incremental comprises identifying that the first subset of object-based snapshots that are not associated with an active parent object-based snapshot at a given point-in-time.

16. The one or more non-transitory computer readable media of claim 14, wherein snapshot objects of the listing are stored in an object data store, and wherein each full manifest includes a location on the object data store of each of the snapshot objects that collectively represent data of the block-storage volume corresponding to the object-based snapshot associated with full manifest.

17. The one or more non-transitory computer readable media of claim 16, wherein the sets of full and differential manifests are stored within the object data store.

18. The one or more non-transitory computer readable media of claim 14, wherein identifying the first subset of the set of object-based snapshots that are non-incremental comprises inspecting metadata of the plurality of object-based snapshots, the metadata identifying a state of each of the plurality of object-based snapshots as incremental or non-incremental.

19. The one or more non-transitory computer readable media of claim 18, wherein the metadata identifies each of the plurality of object-based snapshots as incremental or non-incremental by identifying whether each of the plurality of object-based snapshots depends on a prior object-based snapshot and identifying an active time period of the prior object-based snapshot.

20. The one or more non-transitory computer readable media of claim 14, wherein the instructions further cause the computing system to de-duplicate the listing of snapshot objects that are referenced by any one or more of the plurality of object-based snapshots.

* * * * *